(12) United States Patent
Raymond et al.

(10) Patent No.: US 8,226,044 B2
(45) Date of Patent: Jul. 24, 2012

(54) DEVICE FOR REDUCING AERODYNAMIC DRAG OF A VEHICALE

(75) Inventors: Gerald Raymond, Saint Medard en Jalles (FR); Philippe Bourdieu, Lanton (FR)

(73) Assignee: Astrium SAS, Paris (FR)

( * ) Notice: Subject to any disclaimer, the term of this patent is extended or adjusted under 35 U.S.C. 154(b) by 29 days.

(21) Appl. No.: 12/745,022

(22) PCT Filed: Nov. 21, 2008

(86) PCT No.: PCT/EP2008/065956
§ 371 (c)(1),
(2), (4) Date: Sep. 23, 2010

(87) PCT Pub. No.: WO2009/068475
PCT Pub. Date: Jun. 4, 2009

(65) Prior Publication Data
US 2011/0024572 A1 Feb. 3, 2011

(30) Foreign Application Priority Data
Nov. 29, 2007 (FR) ...................................... 07 59433

(51) Int. Cl.
*B64G 1/40* (2006.01)
(52) U.S. Cl. .................................................. 244/171.1
(58) Field of Classification Search .............. 244/118.5, 244/129.1, 130, 1 N; 60/771, 776, 255, 245
See application file for complete search history.

(56) References Cited

U.S. PATENT DOCUMENTS

| 3,269,113 | A | * | 8/1966 | Crews et al. ..................... 60/255 |
| 3,372,548 | A | * | 3/1968 | Mathis et al. ..................... 60/771 |
| 3,432,125 | A | * | 3/1969 | Schroeder, Jr. ............... 244/130 |
| 3,482,783 | A | * | 12/1969 | Nebiker et al. .......... 239/265.15 |
| 4,384,454 | A | * | 5/1983 | Engl ............................... 60/245 |
| 4,411,399 | A | | 10/1983 | Hapke |
| 6,297,486 | B1 | | 10/2001 | Rom |
| 6,745,979 | B1 | | 6/2004 | Chen |
| 6,926,345 | B2 | | 8/2005 | Ortega |
| 7,251,941 | B2 | * | 8/2007 | Koshoffer et al. .............. 60/766 |
| 2006/0043236 | A1 | | 3/2006 | Campbell |

FOREIGN PATENT DOCUMENTS

| DE | 4101960 | 7/1992 |
| DE | 19640965 | 4/1997 |
| EP | 0273850 | 7/1988 |
| JP | 2003291864 | 10/2003 |

OTHER PUBLICATIONS

International Search Report dated Apr. 9, 2009.

* cited by examiner

*Primary Examiner* — Rob Swiatek
*Assistant Examiner* — Valentina Xavier
(74) *Attorney, Agent, or Firm* — RatnerPrestia

(57) ABSTRACT

A device for reducing the aerodynamic drag of a vehicle includes at least one masking element for at least one part of a nozzle of the vehicle's engine, the masking element having a resorbable material designed to be eliminated in the nozzle's flow once the engine is ignited. A space craft includes the nozzle attached to the fuselage of the space craft.

29 Claims, 3 Drawing Sheets

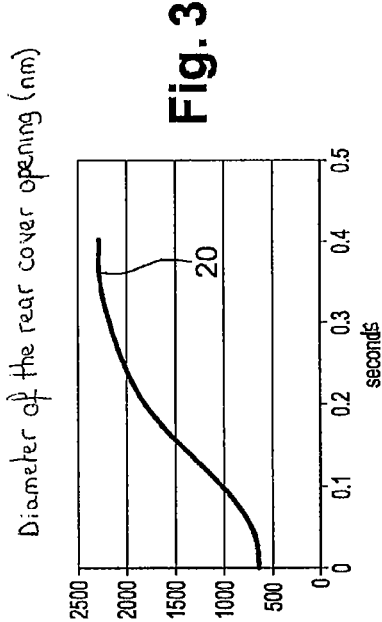
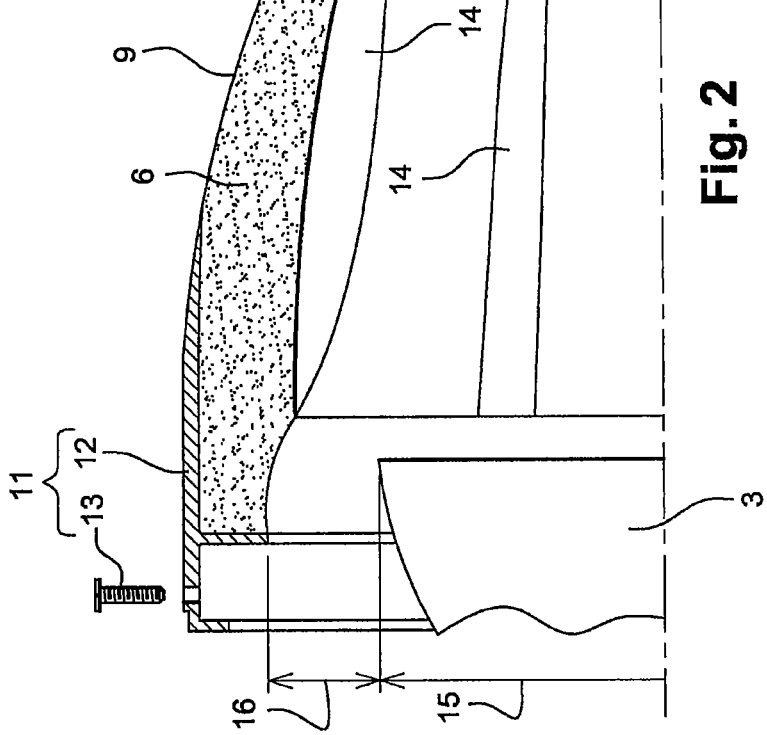

DEVICE FOR REDUCING AERODYNAMIC DRAG OF A VEHICALE

RELATED APPLICATIONS

This application is a U.S. national phase entry of PCT International Application No. PCT/EP2008/065956 filed Nov. 21, 2008, which claims the priority of French Application No. FR 07 59433, filed Nov. 29, 2007, the contents of which are incorporated by reference herein for all purposes.

FIELD OF THE INVENTION

This invention relates to a device for reducing aerodynamic drag caused by the rocket engines of a spacecraft such as a space plane in the flight phases where these engines are not yet used while allowing these engines to operate in the atmosphere/non-atmosphere transition flight phases and in the subsequent non-atmospheric flight phase.

In particular it finds its application for space vehicles that comprise a traditional aerial engine for the atmospheric flight and rocket propulsion for the flight outside the atmosphere.

BACKGROUND

A vehicle's resistance to movement due to its rear section is known as base drag.

The fluid flows that have difficulty following the rear profiles of moving vehicles become turbulent behind the vehicle, which reduces pressure at the rear of the vehicle and creates a strong resistance to the vehicle's forward movement.

Passive solutions exist that reduce the rear drag of vehicles and in particular solutions are known wherein a vehicle's rear profile is realized as a cone by using an inflatable bladder as described for example in document DE 41 01 960, adding flow deflection profiles as described for example in document EP 0 273 850, one or more annular appendages as in document U.S. Pat. No. 6,297,486, lateral deflectors as in document U.S. Pat. No. 6,926,345.

Other realizations are based on active means such as mobile slats as described in document U.S. Pat. No. 4,411,399 or an injection of fluid in the rear of the vehicle in order to fill the depression.

Aerial vehicles propelled by jet engines present a jet pipe propelling nozzle and the jet engines only create a small amount of drag because the jet of ejected gases plays a role in the vehicle's aerodynamic profile.

In contrast an unused engine creates an enormous amount of drag (up to one third of the vehicle's total drag).

That is why, for example, when the American space shuttle currently in service is transported by airplane, it is equipped with a conical rear cover masking the nozzles of its rocket engines.

On the other hand, this cover cannot be used when this shuttle is launched because it would be necessary to jettison it before igniting the rocket engine, which would entail designing a cumbersome release device ensuring that no debris could damage the shuttle or the boosters.

Similarly, removable active devices are difficult for a space plane to use because they are heavy and require devices for operating them.

Furthermore, these systems are complex to implement, since they must be deployed without creating additional drag themselves when the rocket engine is ignited, which occurs in atmospheric flight.

Similarly, using active fluid-injection devices would require the fluid to be carried in the vehicle, which would reduce its payload.

SUMMARY OF THE INVENTION

Starting from this prior art, the aim of this invention is to realize a rocket engine nozzle cowling device that is light, simple, does not hinder the starting up of the rocket engine, poses no deployment problems and avoids projections of debris and the risks of this debris falling towards the ground.

To do this, the present invention proposes a device for reducing a vehicle's aerodynamic drag, equipped with at least one engine fitted with a jet pipe propelling nozzle projecting beyond the rear of the vehicle's fuselage and getting wider the farther away it gets from the rear of the vehicle's fuselage, which comprises at least one element, for masking at least one part of the nozzle, in resorbable material designed to be eliminated in the nozzle's flow once the engine is ignited.

BRIEF DESCRIPTION OF THE DRAWINGS

Other features and advantages of the invention will be better understood in reading the description of a non-limiting example of realization of the invention with reference to the drawings, which show.

DETAILED DESCRIPTION

This invention proposes a device for reducing the aerodynamic drag of a vehicle 1 such as a space plane and a space launcher.

The principle of the invention is to use a passive device that can be eliminated by the rocket engine itself when it is ignited. The passive device can also offer a very light solution the reliability whereof is obtained through its design.

The device of the invention is designed to allow the proper ignition of the rocket engine and the complete elimination of the device after ignition, so as to avoid the risks of debris falling to the ground.

Figure 1:
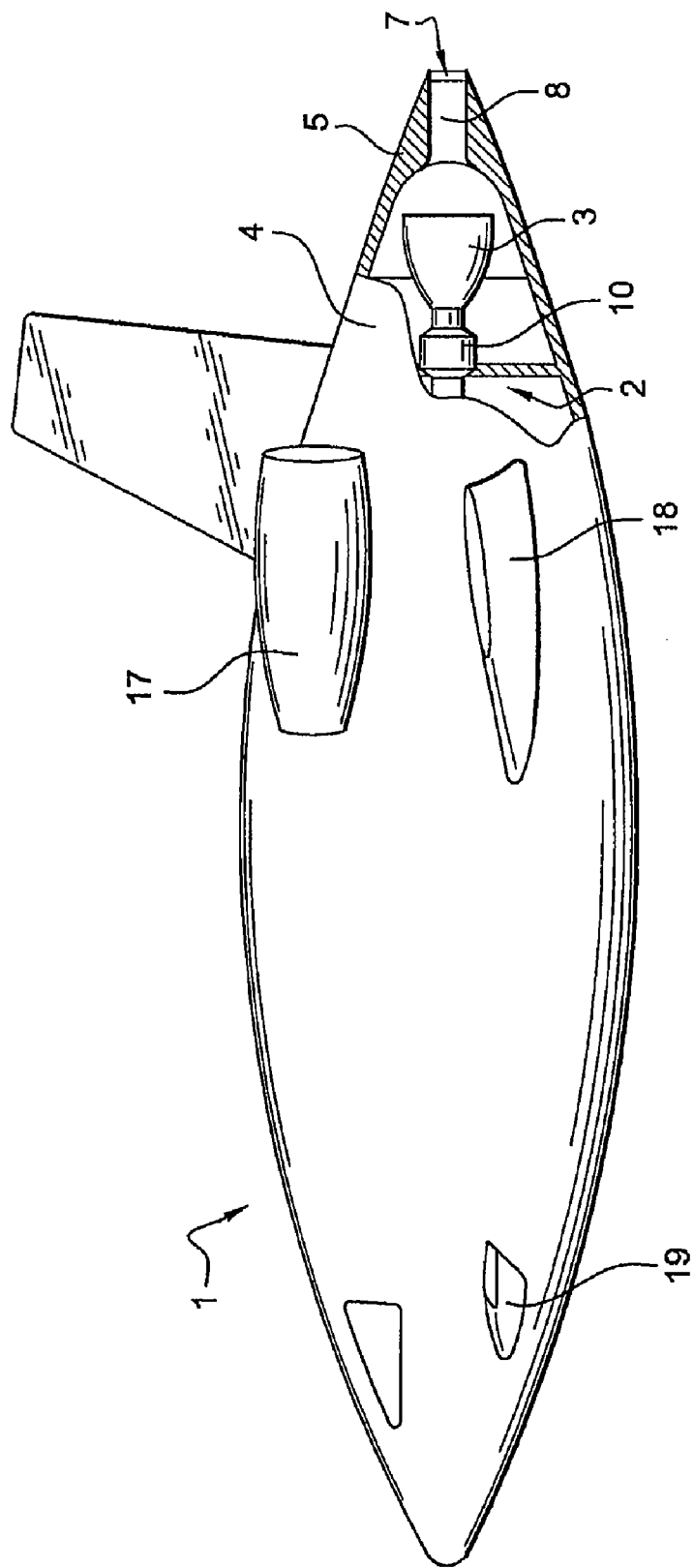
in FIG. 1: an exploded schematic representation of a space plane comprising the device according to the invention, in FIG. 2: a half-view in cross-section of an example of realization of a device according to the invention, in FIG. 3: a table representing the opening up by combustion, following the ignition of the engine, of the masking element of the device of the invention as a function of time.

The example represented in FIG. 1 is a space plane, equipped with at least one engine 2 fitted with a jet pipe propelling nozzle 3 projecting beyond the rear of the fuselage 4 of the space plane.

The jet pipe propelling nozzle of the engine gets wider the farther away it gets from the rear of the vehicle's fuselage as it is traditionally known.

The masking device comprises at least one masking element 5 in resorbable material, i.e. a material that is eliminated by combustion, fusion, sublimation or by breakdown when it is subjected to a heat flow, designed to be dissolved or eliminated (by combustion, sublimation, liquefaction, pulverization or other phenomenon of thermal destruction) in the nozzle's flow once the engine is ignited.

The masking element covers at least one part of the nozzle, the rear part of the nozzle 3 as represented in FIG. 2.

According to the example, the fuselage extends around a combustion chamber 10 of the engine and around at least one part of the nozzle (3) of said engine.

The device is attached to the vehicle's fuselage at the rear extremity of this fuselage in order to cover the part of the nozzle not masked by the fuselage and extend the latter via a conical shape reducing the vehicle's drag in its atmospheric flight phase.

Figure 4:
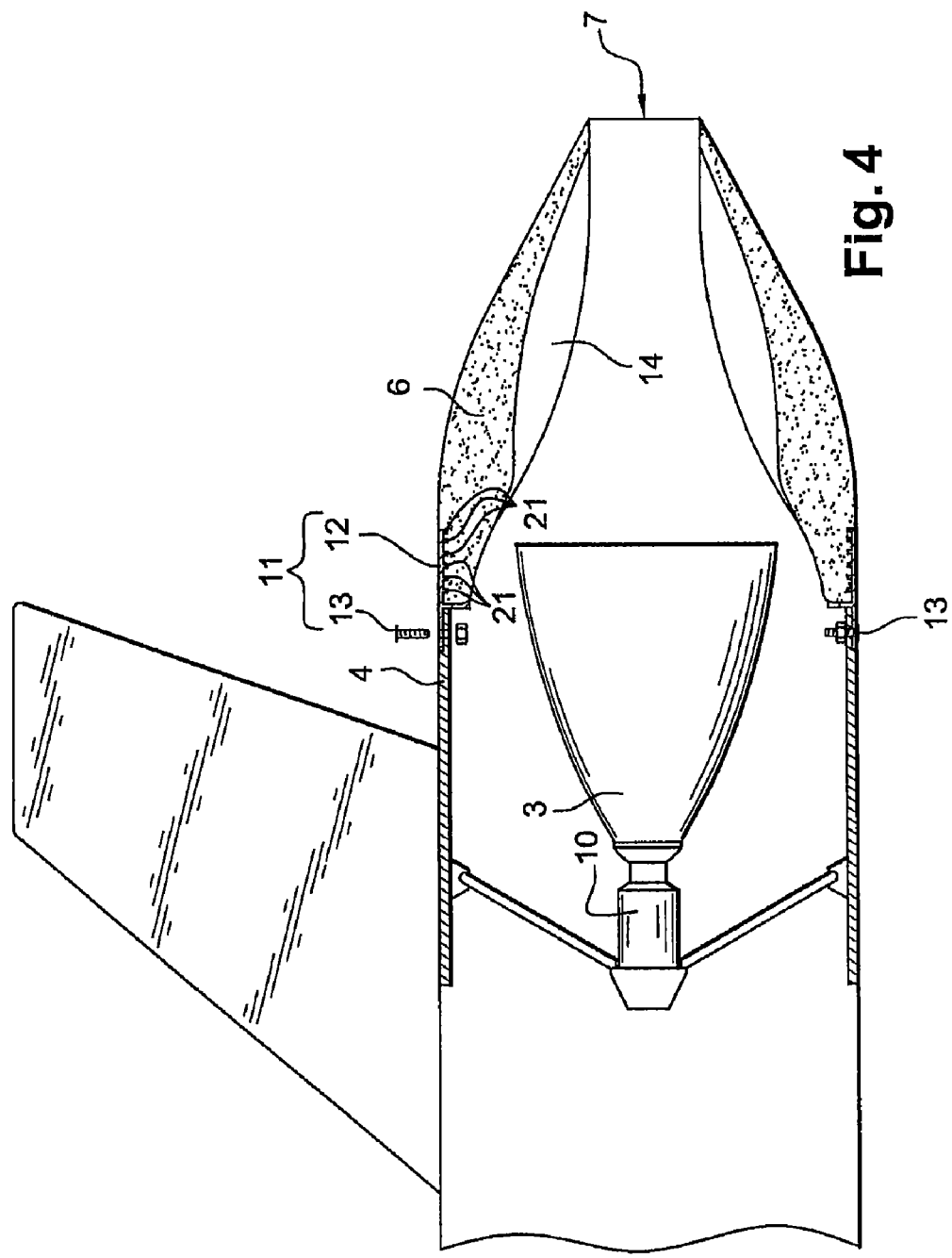
in FIG. 4: a schematic representation in cross-section of the installation of the device of the invention on an aircraft fuselage.

FIG. 4 gives a schematic representation in cross-section of the installation of the device of the invention on an aircraft fuselage 4.

The masking element is secured to the rear of the fuselage 4 of the vehicle by removable fixing means 11.

To allow them to be reused, the removable fixing means 11 are designed to be removed and, according to the example represented in FIG. 4, the removable fixing means comprise a ring element 12 on which the masking element is stuck or overmolded and a set of nuts and bolts 13.

The fixing of the ring on the fuselage can also be achieved by a system of toggle fasteners not shown.

The removable fixing means 11 remain fixed on the vehicle's fuselage after combustion of the masking element and are removed after the space plane's return in order to re-equip them with a new masking element or to replace them.

The masking element 5 shown in cross-section in FIG. 2 and FIG. 4 is a cover in a generally conical shape prolonging the vehicle's fuselage externally beyond the nozzle 3 and the diameter of which gets smaller the farther away it gets from the fuselage.

According to the example of FIGS. 1 and 4, the fuselage extends around a combustion chamber 10 of the engine and here at least one part of the nozzle 3 of said engine, the masking element surrounding the part of the nozzle not masked by the fuselage.

It is clearly possible in the context of the invention to provide for a longer masking element if it is decided not to surround the engine and part of the nozzle by the fuselage.

Rather than being closed behind the nozzle, the cover comprises a distal opening 7 opposite the nozzle opening in order to let the hot gases escape at the start of the engine's ignition and not block the engine's emerging jet.

As shown in FIG. 2, the distal opening has a smaller diameter with respect to the nozzle's opening in order to retain the most efficient aerodynamic profile possible and so that the hot gases begin to burn the masking element very soon after the engine is ignited.

Its cross-sectional area is a compromise between the requirements for the engine's ignition and the drag.

In a variant according to FIG. 1, the distal opening is part of a channel 8 of reduced diameter in the axis of the cover designed to let the engine be ventilated during a part of the vehicle's flight with the engine not yet ignited and to allow the engine's jet to establish itself.

The resorbable material 6 chosen is preferably a foam material of low density and thus very light but sufficiently rigid to bear the aerodynamic constraints and the vibrations from the craft's flight.

The resorbable material of the cover is chosen such that it is light and can be resorbed due to the effect of the jet from the nozzle. This material can be chosen from amongst the foam materials, and especially expanded polystyrene, melamine foam, expanded PVC, polyurethane foam or other light and resistant resorbable material.

In a standard way in aeronautics, the interior shape of the cover comprises ribbing 14 so as to increase its rigidity.

The material is chosen so that the ignition of the engine, which moreover benefits from a protected environment, generates a jet whereof the temperature and the flow rate are such that they melt and vaporize the cover very quickly. In practice this latter is preferably designed to have almost disappeared before the stabilized propulsion speed is established.

For a fuselage rear diameter of the 2300 mm, a diameter 15 of the nozzle of 1500 mm and allowing a necessary margin for the displacement of the nozzle for piloting the space plane, the interior diameter 15+16 of the cover is around 2100 mm. For good aerodynamic efficiency, its length is around 3 m for a plane with a length of around 20 meters.

An example of realization is realized with a one-piece cover in molded expanded polystyrene.

Polystyrene is a good material for this application because it presents a low melting temperature 150° C.-170° C., it is available in blocks of sufficient size so that prototypes can be cut at low cost and, although it is considered a closed cell material, it resists without damage a pressure reduction of 1000 to 30 mBars in 5 minutes, which qualifies it for an altitude of 25 km.

Further, its mechanical characteristics mean the cover can be realized and, amongst the current foams such as those mentioned previously, polystyrene foam is the one that melts best.

In addition, it is a material that is not very expensive, easy to utilize and non-polluting.

In particular a polystyrene known under the commercial reference "UNIMAT FM 24 kg/m3" will be chosen.

This foam is a fire-proofed material, which means that any debris will extinguish itself.

A colorant can possibly be added to the foam to produce a plume when the engine is ignited.

The shape of the cover is cut or molded and the block of foam is glued onto the ring advantageously in aluminum, which provided the interface with the structure.

Striations or indentations 21 are possibly provided on the ring 12 at the interface with the cover 6 in order to increase its retention.

The device is attached to the fuselage by means of the ring, which remains fixed on the fuselage after the masking element has disappeared so that it protects the nozzle during re-entry.

As seen previously, the ring is removed after landing for recycling.

The resorbable material 6 is covered by a skin 9 represented in FIG. 2 for a better surface condition. This exterior skin, for example realized in epoxy, increases the cover's impact resistance and allows the masking element to be painted.

Taking into account a side load of around 20000N/m3, which is a standard value in aeronautics, a breaking load of 200 KPa and a safety factor of 2, a skin with a thickness of 200 mm of foam is required to withstand the bending moment at the foam/ring interface. This thickness is reduced towards the end of the cover opposite to the fixing.

The mass of foam is thus approximately 65 kg.

The aluminum ring is estimated to be 600 mm wide and 3 mm thick, resulting in a mass of approximately 35 kg.

Polystyrene is a material that does not have any latent heat of fusion because of its non-crystalline nature. On the other hand, it has a specific heat given in the literature of close to 1.3 kJ/(kg×°K). Polystyrene become doughy at around 120° C.

Polystyrene's melting temperature is between 150 and 170° C. The temperature of the hot wires for cutting the blocks is set between 100 and 200° C. depending on the cutting speed required. Above a certain temperature, the polystyrene is sublimed in front of the wire, which avoids clogging this latter. It is considered that a rise in temperature from −50° C. (ambient at 10,000 m altitude) to 170° C. will be sufficient to melt or sublime the material.

The abrasive effect of the jet is not considered other than for evacuating the gases, drops and soot due to the cover's combustion.

The graph in FIG. 3 gives an estimation of the diameter 20 of the cover's opening by time according to the application considered.

Taking into account the material's density of around 24 kg/m3, a flow of 1300×24×220=6900 kW/m2 must therefore be applied in order to reduce the polystyrene at the speed of 1 m/s.

In addition, the temperature of the flame on output from the nozzle is estimated at 3000° C. This flame is in direct contact with the polystyrene. Stephens law allows us to calculate the thermal flow, which is 5.67 10−8×30004=4600 kW/m2.

Thus, according to these data, less than 0.2 seconds will be needed to make the cover disappear in front of the nozzle, where the thickness is around 10 cm, and 0.4 seconds to make it disappear almost completely. In practice, taking the jet effect into account, it is probable that the polystyrene will be discharged as soon as it reaches the point at which it becomes doughy and loses its cohesion, i.e. after approximately 0.14 seconds. This length of time is to be compared to the time required to establish the engine speed, for example 7 seconds for the Vulcain engines of the Ariane rocket.

The combustion of the polystyrene (C8H8) does not lead to the emission of pollutants, which makes this material particularly suitable.

Moreover, the presence of the cover will reduce the aeronautic turbulences in the nozzle and will facilitate the firing up of the engine.

The invention is especially suited to suborbital vehicles, a schematic example of which is given in FIG. 1, where the first part of the trajectory is ensured by an aeronautical type of propulsion, with engines 17 operating with oxygen from the air and foils 18, 19, before switching to a rocket type of propulsion.

The invention is useful through the reduction in drag it enables taking into account its low mass and its simplicity, whether the vehicle is in two stages (carrier plane then suborbital rocket vehicle) or a single stage.

The invention can also be applied to multi-stage launch vehicle assemblies, for example to reduce the drag of missiles installed onboard.

The invention is not limited to the example represented and in particular the cover element can have an oval cross-section if the spacecraft comprised two engines or more.

The invention claimed is:

1. A device for reducing the aerodynamic drag of a vehicle, equipped with at least one engine fitted with a jet pipe propelling nozzle projecting beyond the rear of the vehicle's fuselage and getting wider the farther away it extends from the rear of the vehicle's fuselage, the device comprising at least one masking element for at least one part of the nozzle, the masking element comprising resorbable material designed to be eliminated in the nozzle's flow once the engine is ignited wherein said masking element is a cover prolonging the vehicle's fuselage externally beyond the nozzle and aerodynamically shaped to reduce the aerodynamic drag of the vehicle.

2. The device according to claim 1 wherein said cover is shaped in a generally conical shape, the diameter of the cover decreasing as the cover extends farther away from the fuselage.

3. The device according to claim 2 wherein the cover comprises a distal opening opposite the nozzle opening.

4. The device according to claim 3 wherein the distal opening has a smaller diameter with respect to the nozzle's opening.

5. The device according to claim 3 wherein the distal opening is part of a channel of reduced diameter and is coaxial with the axis of the cover, the channel designed to let the engine be ventilated during a part of the vehicle's flight with the engine not yet ignited and to allow the engine's jet to establish itself.

6. The device according to claim 1 wherein the resorbable material is a foam material.

7. The device according to claim 6 wherein the foam material is one of expanded polystyrene, melamine foam, expanded PVC, and polyurethane foam.

8. The device according to claim 1 wherein the resorbable material is covered by a skin for a better surface condition.

9. The device according to claim 1 wherein the resorbable material is a fire-proofed material.

10. A space craft comprising a device according to claim 1 wherein the device is attached to the fuselage.

11. The space craft according to claim 10 wherein the fuselage extends around a combustion chamber of the engine.

12. The space craft according to claim 10 wherein the fuselage extends around at least one part of the nozzle of said engine.

13. The space craft according to claim 10 wherein the masking element is secured to the rear of the fuselage of the vehicle by a removable fixing means.

14. The space craft according to claim 13 wherein the removable fixing means comprises a ring element.

15. The space craft according to claim 13 wherein the removable fixing means is designed to be detachable, the removable fixing means remaining fixed on the vehicle's fuselage after combustion of the masking element.

16. A device for reducing the aerodynamic drag of a vehicle, equipped with at least one engine fitted with a jet pipe propelling nozzle projecting beyond the rear of the vehicle's fuselage and getting wider the farther away it extends from the rear of the vehicle's fuselage, the device comprising at least one masking element for at least one part of the nozzle, the masking element comprising resorbable material designed to be eliminated in the nozzle's flow once the engine is ignited, wherein said masking element is a cover in a generally conical shape prolonging the vehicle's fuselage externally beyond the nozzle, the diameter of the cover decreasing as the cover extends farther away it gets from the fuselage.

17. The device according to claim 16 wherein the cover comprises a distal opening opposite the nozzle opening.

18. The device according to claim 17 wherein the distal opening has a smaller diameter with respect to the nozzle's opening.

19. The device according to claim 17 wherein the distal opening is part of a channel of reduced diameter and is coaxial with the axis of the cover, the channel designed to let the engine be ventilated during a part of the vehicle's flight with the engine not yet ignited and to allow the engine's jet to establish itself.

20. The device according to claim 16 wherein the resorbable material is a foam material.

21. The device according to claim 20 wherein the foam material is one of expanded polystyrene, melamine foam, expanded PVC, and polyurethane foam.

22. The device according to claim 16 wherein the resorbable material is covered by a skin for a better surface condition.

23. The device according to claim 16 wherein the resorbable material is a fire-proofed material.

24. A space craft comprising a device according to claim 16 wherein the device is attached to the fuselage.

25. The space craft according to claim 24 wherein the fuselage extends around a combustion chamber of the engine.

26. The space craft according to claim 24 wherein the fuselage extends around at least one part of the nozzle of said engine.

27. The space craft according to claim 24 wherein the masking element is secured to the rear of the fuselage of the vehicle by a removable fixing means.

28. The space craft according to claim 27 wherein the removable fixing means comprises a ring element.

29. The space craft according to claim 27 wherein the removable fixing means is designed to be detachable, the removable fixing means remaining fixed on the vehicle's fuselage after combustion of the masking element.

* * * * *